(12) United States Patent
Thapliyal et al.

(10) Patent No.: US 12,411,830 B2
(45) Date of Patent: Sep. 9, 2025

(54) RULE EVALUATION FOR REAL-TIME DATA STREAM

(71) Applicant: Salesforce, Inc., San Francisco, CA (US)

(72) Inventors: Ashish Thapliyal, Frisco, TX (US); Rajiv Karuthethil, Sunnyvale, CA (US); Lingyu Deng, Redmond, WA (US); Prahshant Bharadwaj, Sammamish, WA (US); Sudheer Kumar Kanaka, Bangalore (IN); Vishal Meghani, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/937,403

(22) Filed: Sep. 30, 2022

(65) Prior Publication Data

US 2023/0096523 A1    Mar. 30, 2023

(51) Int. Cl.
  *G06F 15/16* (2006.01)
  *G06F 16/22* (2019.01)
  *H04N 21/60* (2011.01)

(52) U.S. Cl.
  CPC ......... *G06F 16/2264* (2019.01); *H04N 21/60* (2013.01)

(58) Field of Classification Search
  None
  See application file for complete search history.

(56) References Cited

U.S. PATENT DOCUMENTS

| | | | | |
|---|---|---|---|---|
| 2010/0185963 A1* | 7/2010 | Slik | .............. | G06F 16/278 715/764 |
| 2015/0235258 A1* | 8/2015 | Shah | .............. | G06Q 30/0242 705/14.45 |
| 2015/0365234 A1* | 12/2015 | Marten | .............. | G06F 21/36 726/8 |
| 2015/0365309 A1* | 12/2015 | Kaminski | .............. | H04L 47/83 709/224 |
| 2020/0104911 A1* | 4/2020 | Suvajac | .............. | G06N 3/04 |
| 2020/0380000 A1* | 12/2020 | Busjaeger | .............. | G06F 16/24552 |
| 2021/0124746 A1* | 4/2021 | Klaedtke | .............. | G06F 16/24556 |
| 2021/0227278 A1* | 7/2021 | Fiderer | .............. | H04N 21/812 |

* cited by examiner

*Primary Examiner* — Alex Gofman
(74) *Attorney, Agent, or Firm* — Holland & Hart LLP

(57) ABSTRACT

Methods, systems, apparatuses, and computer program products are described. A computing device may receive a user input indicating a data stream, a data metric configured for a tenant of a multi-tenant database system, a rule associated with the data metric, a trigger based on the data metric, or some combination thereof. The computing device may receive, from the data stream, a real-time data stream including information corresponding to the data metric configured for the tenant, where the real-time data stream may be associated with a first user profile stored at the multi-tenant database system. The computing device may evaluate the rule, the trigger, or both based on ingesting the data stream and may perform the action based on the evaluation. Performing the action may involve sending a message to a user device associated with the first user profile in response to at least a portion of the data stream.

20 Claims, 11 Drawing Sheets

| Data Streams ▾ | Data Lake Objects | Calculated Insight | Data Actions | Segments |

Real-time Mobile Stream Behavioral Events

| | | | |
|---|---|---|---|
| 1. cartItem_quantity | quantity | cartItem_quantity_c | Number |
| 2. catalog_id | id | catalog_id_c | Text |
| 3. catalog_interaction_n | interaction_na | catalog_interaction_n | Text |
| 4. catalog_pageview | pageview | catalog_pageview_c | Text |
| • | • | • | • |
| • | • | • | • |
| • | • | • | • |

400

| Fields | Insights | Functions |

New Calculated Insight

SELECT SUM(RealTimeMobileEvents_dlm.cartitem_price_c) as cart_price_c,
SELECT SUM(RealTimeMobileEvents_dlm.orderitem_price_c) as order_price_c,
RealTimeMobileEvents_dlm.order_sourceChannel_c) as order_channel_c,
WINDOW_START as start_c
WINDOW_END as end_c
FROM
RealTimeMobileEvents_dlm
GROUP BY
Window (RealTimeMobileEvents_dlm.dateTime_c, '6 MINUTE')
order_channel_c

500

FIG. 5

RULE EVALUATION FOR REAL-TIME DATA STREAM

CROSS REFERENCE

The present application for patent claims the benefit of Indian Provisional Patent Application No. 202141044368 by Thapliyal et al., entitled "RULE EVALUATION FOR REAL-TIME DATA STREAM," filed Sep. 30, 2021, assigned to the assignee hereof, and expressly incorporated by reference in its entirety herein.

FIELD OF TECHNOLOGY

The present disclosure relates generally to database systems and data processing, and more specifically to rule evaluation for a real-time data stream.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may run on a relational database, and data within the relational database may be configured in tables with schemas or metadata structures (e.g., referred to as objects). Such a cloud platform may support content distribution to users. The cloud platform may also support applications and pages for viewing CRM information, updating data records, or performing other CRM or data-related activities. Users may access these applications and pages on different user devices. In some cases, the cloud platform may use a service that supports real-time or pseudo-real-time ingestion of data for a tenant in a multi-tenant system. However, in some cases, real-time data may not support specific functions for the tenant of the multi-tenant system.

BRIEF DESCRIPTION OF THE DRAWINGS

FIGS. 4 through 6 illustrate examples of user interfaces that support rule evaluation for real-time data streams in accordance with aspects of the present disclosure.

DETAILED DESCRIPTION

Figure 1:
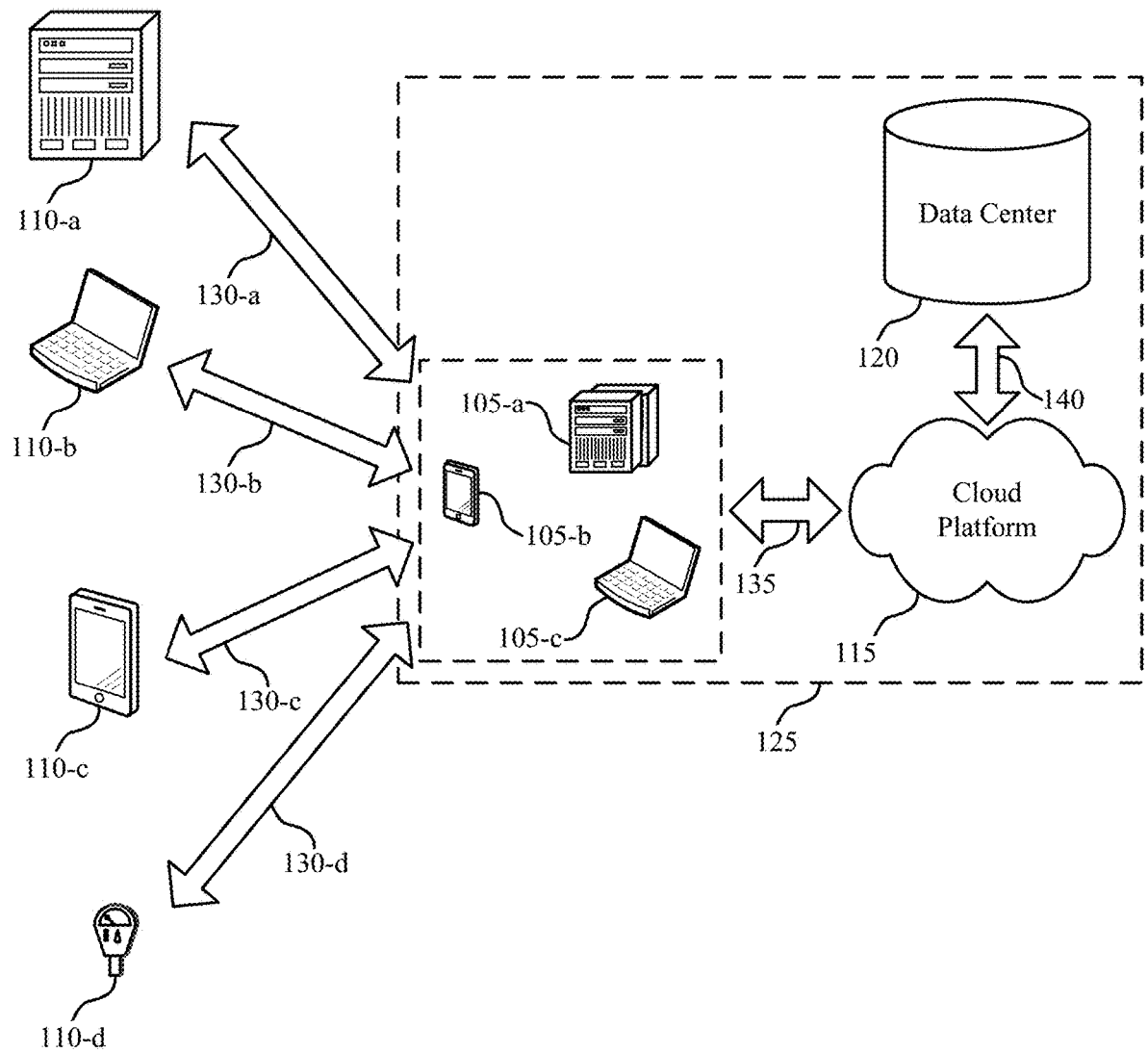
FIG. 1 illustrates an example of a system for cloud computing that supports rule evaluation for a real-time data stream in accordance with aspects of the present disclosure.

A system (e.g., a cloud-based system supporting customer relationship management (CRM) solutions) may support applications, pages, or both for displaying components. These components may display information, perform defined actions, provide links to other applications (e.g., third-party applications outside the cloud-based system), or provide any other features as indicated in the component definitions. A multi-tenant database system may store information and data for users, customers, organizations, or some combination thereof for different tenants in a database. As described herein, a cloud platform (e.g., including a CRM system) may support multiple data records or data objects for multiple tenants. The cloud platform may support a data platform for customers. In some examples, such a cloud platform (e.g., a multi-tenant cloud platform) may provide data processing and analytics solutions within a relational database (e.g., referred to as a core platform) or another type of database. In the cloud platform, data may be presented or structured as an object (e.g., a row in a data table schema or metadata structure), which may additionally, or alternatively, be referred to as a data object. Objects may be queried by various services, clients, or both supported by the cloud platform.

In some systems, customers of a cloud platform may be unable to generate real-time metrics and actions from stream data sources (e.g., providing a real-time or pseudo-real-time data stream). Such metrics may potentially provide timely insights to users or tenants by enabling cross-functional orchestration and increasing user engagement. In some cases, the cloud platform may include a service that supports segmenting users into groups based on profiles and other attributes. These segments of users may be used for marketing purposes, such as content distribution, to a particular set of a target users having some attribute similarities. If control events, segmentation, and activation status changes are enabled for a data stream, the control events may be available for consumption from an internal database system (e.g., core) as record level events on representational entities, supporting end users building flows and triggers. In some aspects, a cloud platform may support insights. Insights may be or may include a definition for one or more data metrics configured for a tenant in a multi-tenant system. However, in some cases (e.g., some applications supporting a customer data platform), insights may not be generated for a real-time data stream.

Aspects of the present disclosure support rule evaluation for a real-time data stream. For example, a system may build, or otherwise support, data analytics and business insights capabilities to empower customers with the right information at the right time to drive data-driven engagements, decisions, and automated flows. To support utilizing real-time data streams in generating insights according to a definition (e.g., a data definition), the present disclosure provides techniques for ingesting a real-time data stream into a definition of an insight (e.g., according to a formula). The real-time perspective, predictive intelligence, and data action capabilities may serve a broad set of scenarios across multiple industry verticals (such as healthcare and life sciences, manufacturing, financial services, retail, or any combination of these or other industries) to solve some challenging business processes in these industries.

The insights generated using the real-time data stream may utilize a real-time data streaming analytics service to analyze streaming data in real-time (or pseudo-real-time). Data cloud streaming insights may produce sophisticated insights on streaming data from multiple sources (e.g., thousands of sources) such as website/mobile clickstreams, internet of things (IoT) signals, database event streams, financial transactions, social media feeds, customer profile updates, location-tracking events, or any combination of these or other sources. The collected data may be analyzed and available in milliseconds to enable real-time analytics (such as real-time anomaly detection, business process orchestration, and real time alerts). Upon generating the insights, aspects of the present disclosure may provide for an alert generation system. For example, the system described herein may receive one or more rules corresponding to an action for a tenant of the multi-tenant database system. The system may receive a real-time data stream associated with the tenant (e.g., data sent to the tenant, data stored for the tenant, data input by users of the tenant). Upon receiving the real-time data stream, the system may evaluate the one or more rules based on ingesting the real-time data stream into a definition for one or more data metrics. That is, the system may calculate an insight using the real-time data stream. Based on the calculated insight, the system may determine whether the calculated insight satisfies one or more rules for triggering an action. The system may then trigger the action based on evaluating the one or more rules. For example, triggering the action may cause the system to send a notification to a user, modify data in a database, update user permissions, update user segmentation, or any combination thereof.

Aspects of the disclosure are initially described in the context of an environment supporting an on-demand database service. Aspects of the disclosure are further illustrated by a system, an architecture, and user interfaces supporting rule evaluation for a real-time data stream. Aspects of the disclosure are further illustrated by and described with reference to apparatus diagrams, system diagrams, and flowcharts that relate to rule evaluation for real-time data stream.

FIG. 1 illustrates an example of a system 100 for cloud computing that supports rule evaluation for a real-time data stream in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

The data center 120 may use a relational database system—or another type of database system—to support various services provided by the cloud platform 115. For example, the relational database system may store data associated with cloud clients 105 and their customers (e.g., contacts 110). The data may include customer data, product data, purchase data, web browsing data, employee data, or any other type of data (e.g., CRM data). The data may be accessible to users via various clients such as web browsers, web applications, websites, or the like.

Some systems implementing relational database systems may support multiple data objects, where each data object may be associated with a data table, and each row of the data table may correspond to an instance of a data object. For example, a data table may store customer information for a tenant, where each row of the data table represents data for a specific customer (e.g., a customer data object), and each column of the data table represents a different data field for the customer data objects (e.g., a name field, an email address field, a purchases field, a billing address field). In some aspects, a cloud platform 115 may support insights. Insights may be or may include a definition for one or more data metrics configured for a tenant in a multi-tenant system. In some cases, an insight may indicate a preferred action to take based on customer data. For example, the insight may indicate a preferred method for contacting a customer (e.g., via email, via text, via mail) based on recent communications with the customer or similar customers. However, in some other systems (e.g., some applications such as a customer data platform), insights may not be generated for real-time data streams.

Aspects of the present disclosure may be used to generate insights by ingesting a real-time data stream into a definition for one or more data metrics. Aspects depicted herein may further be utilized to generate an alert based on ingesting the real-time data stream into the definition. In some examples, this stream may enable applications that can leverage real-time insights and event-driven architectures to make real-time insights available for segmentation of customer experiences (e.g., by adding users to, or removing users from, a segment). Additionally, or alternatively, this stream and event-driven architecture may provide for intelligent routing of services (e.g., via a service cloud), sending notifications if a case is escalated or not worked upon. Additionally, or alternatively, this stream and event-driven architecture may be used in IoT use cases to filter streaming device log data from a device (e.g., a vending machine or some other device) based on error codes to determine most frequent errors and determine if the device should be serviced relatively soon. In some examples, the stream and event-driven architecture may be used in financial services (e.g., to detect fraudulent or suspicious transactions), real-time transportation tracking (e.g., to monitor fuel efficiency of a truck, to detect if fuel efficiency drops below a pre-specified threshold for a sustained period and temperature is within specific range, to send an alert to a maintenance department database), IoT smart meter operations (e.g., leak detection by reading the usage every 15 min from a commercial building, evaluating the reading based on the range pre-specified for the building type, sending an alert to a leak analysis application if the range is above a threshold), enabling business processes (e.g., sending an email or text message when a user updates a password), enabling loyalty (e.g., updating a point balance in a core database based on an order transaction, a social media share, or both), or any combination thereof. In some examples, the stream and event-driven architecture may be used for service and support, data replication, profile update synchronization, or any combination thereof.

As described herein, the streaming data and insights may be collected by a system 100 in real-time or pseudo-real-time (e.g., within a threshold latency time from the data being received from a streaming source) at a relatively high volume (e.g., handling greater than a threshold quantity of data within a time period, such as thousands of emails or transactions an hour). A rule-based action for this data may ensure that customers get highly curated and useful output (e.g., from an outstream of data) to be used in other applications to drive meaningful outcomes (e.g., successful sales, user engagement, secure user interactions). A data action rule may define the specific actions to take when specific conditions are met (e.g., for a specific tenant implementing the rule). A basic action rule may use an if-then statement to associate a condition (if) with an action (then). The rule may state what action to perform when a condition is true. Other rules may support much more complex logic for triggering an action. One or more aspects of the present disclosure provide for techniques to create a data action based on meeting a threshold on streaming data, streaming insights, or calculated insights. Once a condition is met, data actions may be triggered and pushed to the predefined data action destinations. Additionally, or alternatively, users may register or otherwise provide data action targets to the system 100.

For example, the system 100 may support a company, Company A, which is an extended warranty service provider for consumer electronics and appliances. Company A may have large enterprise contracts with major retailers. Recently, one of their large accounts notified Company A that customers receiving warranty services from Company A are unhappy and they might consider switching to a different provider, potentially negatively impacting the brand. The customers asked Company A to improve the quality of service and manage customer escalations with a high level of care. John Doe may be a data engineer for Company A and works to create and build data systems that can enable multiple business processes for Company A that are focused on improving large account retention. He may be asked by a business leader responsible for a large account to create a solution to identify the customers with issues quickly and organize managed care to improve the user experiences. As a solution, John may enable a business process based on real-time insights to quickly log support tickets as soon as a customer previously known to have a good experience posts a negative review and is a customer of a large retailer. With logging of the service ticket, a representative from Company A may call the customer to ensure that the warranty claim is managed well and the customer is happy.

John's employer may use the system 100 and streaming insights with a data action framework to achieve such a scenario. If a customer of a large account just rated Company A's service with a single star review, a support ticket associated with the customer may be intercepted by the streaming insight. For example, the system 100 may utilize insights that reflect that "this customer has historically been a happy customer with Company A >90 and for the year" historic calculation from a regular insight. Because this customer meets the criteria for customers with a poor experience who are generally happy customers, and because the customer is associated with an account which is categorized as a "large retailer," Company A may trigger a data action alert. Upon triggering the data action alert, the system 100 may transmit the payload to a core event bus. Using a flow application, the system 100 may create a service ticket in a service cloud and a representative may contact the customer to improve the user experience for the customer, potentially mitigating further negative reviews or improving the previous review.

As another example, a customer may make a purchase in a specific product category and may receive double loyalty points. The system 100 may send an email with an updated point score to the customer. In another example, the system 100 may utilize the rule evaluation for a real-time data stream to let workers know when inventory is relatively low (e.g., below a threshold quantity) or if there is an urgent service appointment for workers to attend to. In some cases, the system 100 may utilize the rule evaluation for real-time data streams for sending renewal notices, usage limits, database sizes, critical incident notifications, or any combination thereof. Additionally, or alternatively, the system may utilize the rule evaluation for real-time data streams for account-level notifications (e.g., hourly or daily on demand metrics about account level thresholds), threshold messages (e.g., quantities of visitors are higher or lower in a given time period), pricing update triggers (e.g., to update customers on pricing changes in near-real-time), or any combination thereof.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
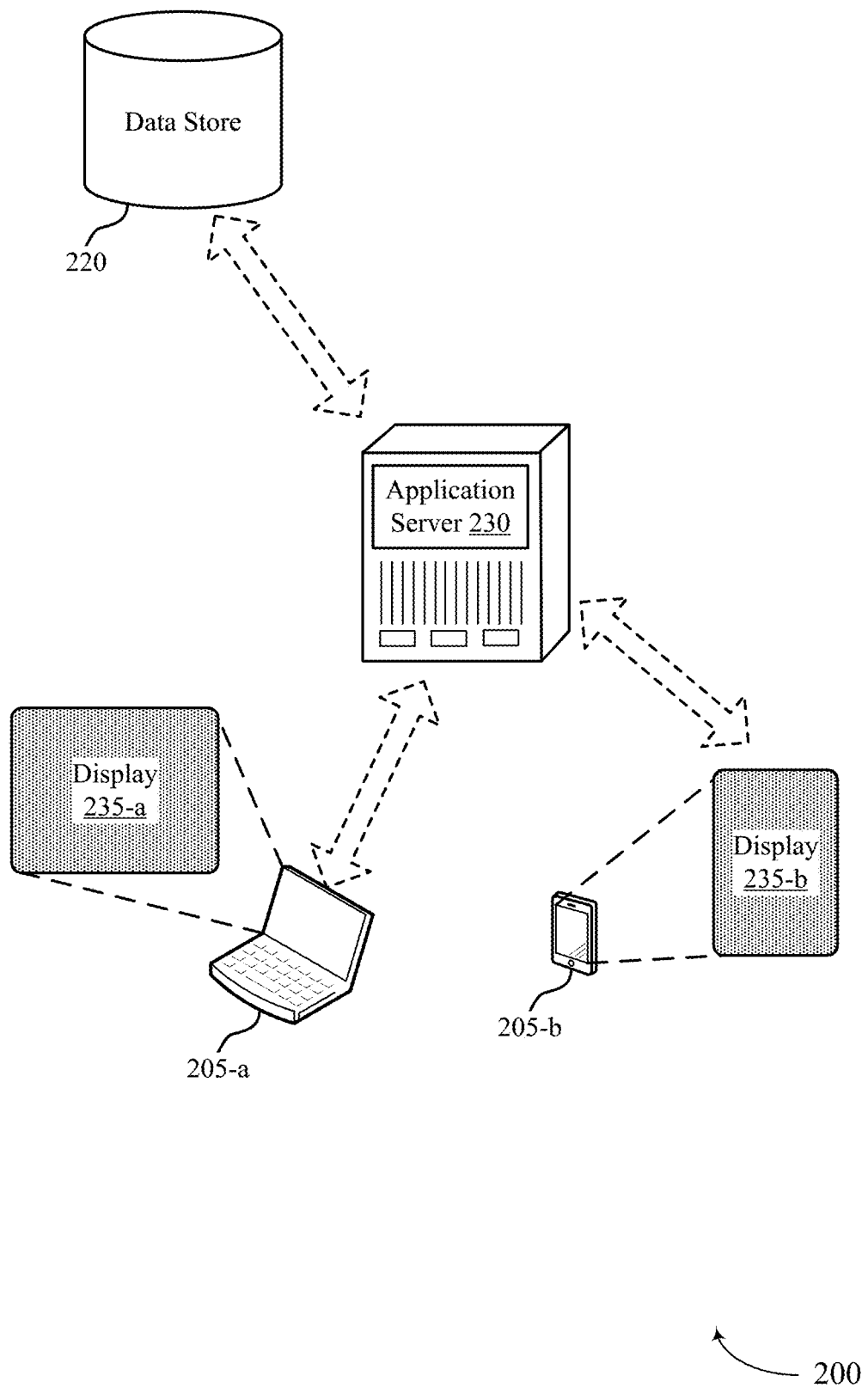
FIG. 2 illustrates an example of a system that supports rule evaluation for a real-time data stream in accordance with aspects of the present disclosure.

FIG. 2 illustrates an example of a system 200 that supports rule evaluation for a real-time data stream in accordance with aspects of the present disclosure. The system 200 may include multiple user devices 205, which may be examples of cloud clients 105 or contacts 110 as described with reference to FIG. 1. The application server 230 may be an example of aspects of the cloud platform 115, the data center 120, or both as described with reference to FIG. 1. For example, the application server 230 may represent various devices or components that support an analytical data system as described herein. The data store 220 may be an example of a data center 120 as described with reference to FIG. 1. The application server 230 may support a multi-tenant database system, which may manage various datasets that are associated with specific tenants (e.g., cloud clients 105).

A first user (e.g., an administrative user, a marketer, a partner) may operate a first user device 205-a running an application that supports rule evaluation for a real-time data stream. Using the user device 205-a and the application, the first user may input a user input including a definition for one or more data metrics configured for a tenant in a multi-tenant system. The first user may additionally input one or more rules corresponding to an action to perform based on a data stream. For example, the first user may input an instruction into a display 235-a associated with the first user device 205-a. As depicted herein, rule evaluation information may be displayed or accessed in different user interfaces. In some examples, the same application (e.g., supported by a single underlying metadata file or container) may be displayed differently on different user devices 205 corresponding to different user interface types. A user accessing an application or page on a user device 205-a (e.g., a laptop or desktop computer corresponding to a large form factor) may view a first display 235-*a*, while a user accessing the same application or page on a user device 205-*b* (e.g., a mobile phone corresponding to a small form factor) may view a second display 235-*b*. Thus, the user accessing an application or page on a user device 205 may view or otherwise interact with rule evaluation (evaluating one or more rules based on ingesting real-time data into a definition for generating an insight) via a display 235.

An application launcher at a user device 205 may indicate the applications or pages that are activated and available for the user device 205. In some cases, activating an application or page may push the application or page to a centralized system or server (e.g., an application server 230). Other user devices 205 may then access and display the activated application or page by interacting with the application server 230 (e.g., via an API). In some cases, when operating online, running an application or page at a user device 205 may involve a link between the user device 205 and the application server 230 storing information about the application or page (e.g., a display template). In some other cases, when operating offline, the user device 205 may store the information about the application or page locally. In some examples, the user device 205 may initially download support for the application or page from the application server 230 before running the application or page without further interactions with the application server 230.

According to one or more aspects of the present disclosure, a first user (e.g., an administrative user, a marketer, a partner) operating the first user device 205-*a* may input a definition for an insight. In some examples, the system 200 (e.g., the application server 230) may import real-time data from the data store 220 or another streaming source. Data cloud streaming insights may help customers with low code or no code solutions to build real-time use cases in minutes without involving tedious development and integration work.

Data used for tactical decisions (e.g., decisions that prioritize daily tasks and activities) may on average lose more than half its value 30 minutes after creation of the data. Value may be measured by the proportion of decisions enabled, meaning that data more than 30 minutes old may contribute to 70% fewer operational decisions than relatively fresher data (e.g., data less than 30 minutes old). Marketing, sales, and operations personnel may make such decisions using custom dashboards or embedded analytics capabilities (e.g., via a user interface of a user device 205-*a*). In some cases, operational data on average may lose about half its value after eight hours. Examples of operational decisions, usually made over a few weeks, include improvements to customer service, inventory stocking, and overall organizational efficiency based on data visualization applications. Data used for strategic decisions may have the longest-range implications, but may still lose half its value roughly 56 hours after creation (a little less than two and a half days). In the strategic category, data scientists and other specialized analysts often may assess new market opportunities and significant potential changes to the business, using a variety of advanced statistical tools and methods.

According to aspects described herein, the system 200 may support a pattern for real-time streaming and insights where a customer data platform or data cloud (e.g., the system 200) may curate business data and insights. These insights may be extremely useful not only within the data cloud but also in enabling scenarios that may ultimately be fulfilled outside of the customer data platform or data cloud.

In the data cloud, data streams leveraging insights may be enriched with the related data from other data objects or insights.

As an example use case, in supply chain scenarios where temperature-sensitive goods are shipped (e.g., vaccine transportation), an IoT device may track the temperature of the shipping box but not the identifier of the shipment. If the shipment exceeds the safe temperature, customers may want to build logic that joins multiple tables to track the shipment identifier that corresponds to the sensor reading. Using tedious searching may increase the time to track the specific container with the correct device identifier, potentially wasting time and increasing risk. This type of scenario may potentially be simplified with rule evaluation for a real-time data stream in accordance with aspects of the present disclosure.

As described herein, the system 200 may provide near real-time analytics and rule evaluation upon ingesting a real-time data stream using a definition for one or more data metrics (e.g., data insights). Real-time (or near real-time) data analytics can drive powerful real-time scenarios for customers. In some examples, use cases for real-time analytics may include too many login attempt from unusual locations, recent online customer behavior, unusual recent product transactions indicating fraud, credit card transaction anomaly detection, workflows based on recent information such as train delay, or any combination of these or other analytics. In some examples, a data cloud platform may enable a broad set of analytical—as well as machine learning—functions to be able to drive highly-valuable real-time insights. The data cloud (hosted by the application server 230) may continuously (or periodically) read and process streaming data from the data store 220 or other streaming sources (e.g., including profile objects in real-time). The application server 230 may utilize the techniques described herein to express insights using an insights builder. The insights may be used to process one or more incoming data streams in order to generate metrics to produce an output. Customers can calculate metrics over one or more specific time windows and may stream values (e.g., metrics, insights) to other platforms or data sources with corresponding actions to perform. In some examples, the application server 230 may be configured to send an output (e.g., based on a triggered action) to one or more destinations. One or more aspects of the present disclosure may support multiple functions as well as various windowing schemes to enable rich time series analysis on data metrics.

In some examples, the system 200 may provide for alerting (an action) and an alert event delivery design (action delivery design) using an eventing infrastructure. In addition to calculating insights using a real-time data stream, the system 200 may provide for enabling change data capture and alert or action event delivery. In some examples, the system 200 may support control events for data streaming, segmentation, activation status changes, or any combination thereof. Control events may be available for consumption from core as record level events on representational entities, such that end users can build flows (e.g., process flows) and triggers. Once the insights are generated for a real-time data stream, calculated insight streaming alerts may be represented, produced, and delivered for end user consumption.

One example use case for a change data capture may be if a customer copies and synchronizes unified customer profile information in their custom implemented downstream external systems. In such cases, the streaming data may allow the system to know as soon as some profile information is modified (e.g., email address or contact phone number of a customer is changed), because the customer's business process flows may depend on the real-time profile update. The sheer volume of profile and engagement data may add complexity to the eventing system. Also, in a big data system, data manipulation (e.g., ingestion, aggregation, computation) may typically occur from various data pipelines (e.g., streams, APIs, micro batches, batches) and there may not be one common layer that handles the data changes from different pipes. In some examples, the insights may be used to define and calculate multidimensional metrics from an entire digital state stored in a customer data platform. The metrics for the definition (e.g., insights) can include customer lifetime value, most viewed categories, customer satisfaction score at the profile, segment, or population level, or any other metrics. Marketers can use calculated insights to define segment criteria and personalization attributes for activation using metrics, dimensions, and filters.

As described herein, the system 200 may receive one or more rules corresponding to an action. The system 200 may evaluate the one or more rules based on ingesting a real-time data stream into a definition for one or more data metrics. For example, the system 200 may evaluate the one or more rules based on calculating an insight using the real-time data stream. In some examples, the application server 230 may receive a second user input via the first user device 205-*a* or the second user device 205-*b*. The second user input may include a selection of a target for the action, where triggering the action may include triggering the action at the target.

To generate an alert, the system 200 may use metadata including an alert definition, a filter definition, a subscription definition, or any combination thereof. The system 200 may further use an event schema (e.g., representation and discovery) and an alert delivery structure. In some examples, the metadata related to the actions may be persisted in core (e.g., a central database) and synced to off-core (e.g., other data storage or systems). The system 200 may use a metadata service database (e.g., the data store 220) as an alert database. In some examples, the system 200 may use APIs to define one or more rules associated with an alert or an action. The system 200 may use an alert orchestrator for managing one or more streaming jobs for filter evaluation of the streamed computed data. In some examples, the system 200 may also support an event service which may be responsible for draining the events from data pipelines and delivering them to the core platform.

In some examples, a customer may define the alerts in core (e.g., supported by the application server 230), which may then get synced to off-core via an asynchronization design pattern. Deleting objects from core may correspondingly delete the objects from off-core (e.g., with message queue delay). Additionally, or alternatively, disabling these objects from core may disable them from off-core, and the objects (e.g., the alerts) may not be processed further by the alert orchestrator. In some examples, alerts and alert targets may be defined independently, where an alert filter and a payload may be defined as part of an alert. In some examples, an alert filter can span multiple tables such that filters are independent rows that can be queried. In some examples, alert target configuration may include any additional authentication details used for a target. For a target type "core," the event object may be pre-defined and no additional details may be received from the customer. In some examples, a composite key (e.g., a developer name with a tenant identifier) may be used as a package for an alert and an alert target. If a relationship is not established explicitly between an alert filter condition and an alert payload, then the application server 230 may maintain the referential integrity between the alert, the alert target, and the corresponding insight. In some examples, alerts may include a post alert (or a post action), a get alert, a delete alert, or any combination thereof and their corresponding targets.

In some examples, an event may be published to a subscriber. In some examples, the event may be represented as follows:

```
{
  "EventType": "TEXT: Schema name of UDD representing
    alert events in CORE",
  "SourceTableDeveloperName": "TE XT: Source table
    identifier for CDC trigger",
  "Trigger":"StaticEnum: Event trigger - CDC/Alert",
  "AlertDeveloperName": "TEXT: Alert identifier",
  "EventCreationDateTime": "DateTime: Event creation time
    at the service generating the
    event",
  "EventPublishDateTime": "DateTime: Event published time
    as seen in Event service",
  "Payload_PrevValue": "TEXT: Event enrichment details",
  "Payload_CurrentValue": "TEXT: Event enrichment details",
  "Payload_Schema": "TEXT: Schema for event payload",
  "EventSchemaVersion": "Number: Schema version of the event",
  "Offset": "Number: Kafka event offset"
}
```

The payload may be a serialized string which is dynamic based on the alert configuration. Additionally, or alternatively, such an event representation may be used for both alerts and change data capture events. Upon generation of an alert event, the event (e.g., the corresponding action) may be delivered to a target.

In some examples, the system 200 may create a consumer for each customer subscription. Each consumer may receive a unique copy of the same message if subscribed to a common topic. Webhooks may be a standard alerting/callback mechanism that pushes events to interested clients facilitating push-based communications that would otherwise use more complex requests or constant polling on a remote server. Webhooks may also scale much better than polling mechanisms in terms of throughput and resource consumption. In the example of creating an event, if a tenant has 3 webhooks listening for one or more alerts, 3 different consumers may be created per webhook under different consumer groups. This may allow each consumer to maintain an offset per customer subscription. Each consumer may be created based on logical filters to be applied on top of tenant strategy. For example, if a Webhook is created to listen for events on an alert, AlertA, then a filter applied on the topic may be "(EventType==Alert && AlertDeveloperName==AlertA)."

According to one or more aspects, the system 200 may perform a batching of events and batch processing for the generated alerts and data change events (e.g., based on the real-time streaming of data). In some examples, relatively high batch size (e.g., above a threshold size) may potentially lead to delay in delivery to a webhook, whereas relatively too small batch size (e.g., below a threshold size) may potentially reduce consumer throughput. Relatively high wait times for a batch to be ready may add to overall delay, and relatively less wait time may not support efficient batch processing. In addition, a batch size and time to wait depends on a size of burst events (e.g., estimated to be around 1 k/min per tenant or 1.25 million per day) and a webhook overhead (estimated to be ~200 ms).

The aspects described herein may provide for powerful real-time processing of business critical data, supporting thousands of data sources with millisecond latency, and enabling powerful workflows. In addition, near real-time insights may be performed at petabyte scale on entire digital states stored in the data cloud. With its vast array of logical, mathematical, statistical, and times-series functions and support for complex workflows, the system 200 may be utilized to calculate any kind of metrics or insights.

Figure 3:
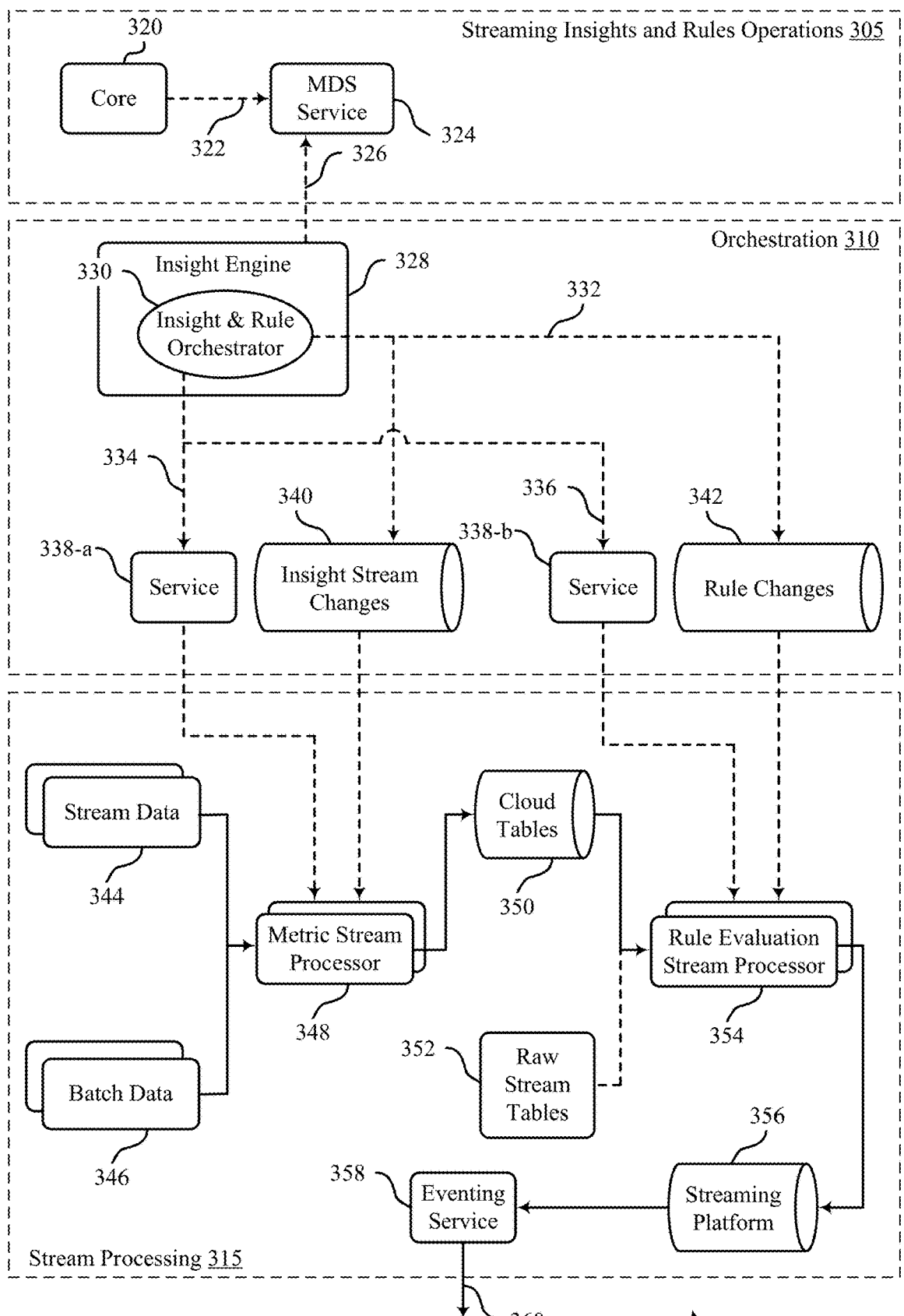
FIG. 3 illustrates an example of an architecture that supports rule evaluation for a real-time data stream in accordance with aspects of the present disclosure.

FIG. 3 illustrates an example of an architecture 300 that supports rule evaluation for a real-time data stream in accordance with aspects of the present disclosure. The architecture 300 may be implemented by an application server, a data store, or both, as described herein with reference to FIGS. 1 and 2. The architecture 300 may support generating insights (e.g., definitions) from one or more real-time streams of data. A streaming insights feature may enable customers to generate metrics and actions from cross-functional stream data 344 in near real-time. A customer or user may define insight computations that may be processed by a stream processing framework, allowing customers to join real-time data (e.g., stream data 344) with batch data 346 to generate metrics and actions that may be performed by an eventing service 358.

According to the architecture 300, a storage application for streaming insights may be implemented on top of another storage application framework for batch insights. The insight metadata may be extended to support streaming insights. The storage application for rules may be supported by an API and schema in both core and off-core platforms (e.g., database servers). An off-core database server may store insights and rules metadata used for orchestration 310. For example, streaming insights and rules operations 305 may be supported by a core platform 320 and an off-core platform, such as a marketing data sharing (MDS) service 324 or another service. The core platform 320 may perform operations 322 on the off-core platform, such as create, read, update, delete, or any combination of these operations. An insight engine 328 may query 326 the off-core platform, the core platform 320, or both to determine or otherwise support insights. For example, in response to the query, the insight engine 328 may receive streaming insights and rules operations 305 defined at the core platform 320, the off-core platform, or both.

The insight engine 328 may include an insight and rule orchestrator 330 for performing orchestration 310. In some examples, the orchestration 310 of an existing batch calculated insight engine may be extended to support streaming and actioning. Two separate orchestration paths may be exercised; job management and monitoring, and incremental changes (e.g., creates, deletes, mapping changes) in stream insights. In some examples, job management may support stateful failover when a job is restarted after a failure. Incremental changes may not support stateful restarts because changes may be either create, delete, or mapping changes that may cause structural changes to the state. The insight engine 328 may send creates, deletes, mapping, and other metadata changes 332 to a pipeline for insight stream changes 340, a pipeline for rule changes 342, or both. Additionally, or alternatively, the insight engine 328 may send stream jobs 334, per tenant, with multiple queries to a first service 338-*a* and may send rule jobs 336, per tenant, with multiple queries to a second service 338-*b* for processing.

For orchestration 310, the workflow phases may be triggered by pushing messages to a single workflow queue. By default, the workflow may be initiated by a tenant schedule (e.g., different and more frequent than the one used by batch workflow). Events from a database server may be used to improve (e.g., optimize) the workflow by switching the schedule to a lower frequency and thus reducing the polling load on the database server. Events related to stream metric generation may trigger updates to partition metadata. In some cases, concurrent workflows may be triggered by multiple messages. The architecture 300 may handle the concurrent workflows using a global clock to serialize workflow updates and save configuration changes as history in a database. In some examples, a single job for metrics (or rules) may be initiated per tenant including multiple stream queries, one for each insight (or definition). The job, once initiated, may be continuously running and any updates to the stream queries may be handled by a driver running in a loop.

The architecture 300 may support stream processing 315, including rule evaluation for a real-time data stream. The stream processing 315 may include receiving an input, processing a metric, and action triggering or storage. In some examples, a mobile software development kit or a web event coming through one or more data pipeline topic(s) may serve as the stream sources for generating insight metrics. These events may be based on schemas, and not raw events. Batch data 346 (e.g., profile and potentially other data objects including batch insights) may be joined with stream data 344 from event streams while generating metrics. Stream inputs for rule processing may be the insight metrics from insight stream jobs streamed through intermediate database tables. In some examples, the profile data may be used to enrich actions during rule evaluation.

For processing, the architecture 300 may use two separate groups of data clusters to run streaming insights and rule evaluation. This may effectively avoid resource conflicts while running jobs with different computational characteristics. Batch data 346 may be cached for stream queries for a tenant to speed up computations. This may mean that updates to the underlying data may not be reflected in the output metric streams because stream jobs may be continuously active with non-expiring caches. To improve the accuracy of such data, the batch data cache may be refreshed periodically at some predefined interval.

For metric and action storage, the output metrics from insight stream jobs may be persisted in database tables capable of streaming out to rule evaluation jobs. Consumers may be able to query the tables with supported aggregations. Actions may be sent to the data pipeline, where an eventing service 358 may apply debouncing and persist actions to support queries on actions.

In some examples, a storage application operation may reuse a common API for calculated insights with an extra parameter, "insightType," to indicate whether the query is a streaming insight or a calculated insight. As part of the request processing, the system may parse the query, identify the dimensions, and perform measurements.

The stream data 344, the batch data 346, or both may be processed by a metric stream processor 348. The metric stream processor 348 may be defined based on insight stream changes 340 and a first service 338-*a* managing stream jobs 334 per tenant. The metric stream processor 348 may operate on a cluster of servers. The metric stream processor 348 may persist stream information in cloud tables 350. This stream information, in some cases along with raw stream information from raw stream tables 352, may be sent to a rule evaluation stream processor 354 for rule evaluation. The rule evaluation stream processor 354 may be defined based on rule changes 342 and a second service 338-*b* managing stream jobs 334 per tenant managing rule jobs 336 per tenant. The rule evaluation stream processor 354 may determine actions to perform (e.g., events to trigger) based on the streaming information and may persist the actions using a streaming platform 356. The streaming platform 356 may trigger events via an eventing service 358 based on the streaming information. For example, the eventing service 358 may send notifications 360 to one or more users or user devices based on events triggered by the streaming platform 356.

Figure 4:

FIG. 4 illustrates an example of a user interface 400 that supports rule evaluation for a real-time data stream in accordance with aspects of the present disclosure. The user interface 400 may be an example of an interface that supports generation of insights (or definitions) based on receiving a real-time data stream, and the user interface 400 may be supported by aspects of FIG. 1, such as a cloud platform 115. As illustrated, the user interface 400 may display a real-time data stream for a specific tenant (e.g., corresponding to a cloud client 105). The user interface 400 may also display a tab for viewing calculated insights. The calculated insights tab may enable a user to input a definition for one or more data metrics to be used by the system (e.g., an application server or other processing device) to generate an insight for a real-time data stream. As depicted in the example of FIG. 4, the real-time mobile stream behavioral events depict different data metrics for different aspects of a real-time data stream. A user may define one or more insights and alerts based on the real-time mobile stream behavioral events.

FIG. 5 illustrates an example of a user interface 500 that supports rule evaluation for a real-time data stream in accordance with aspects of the present disclosure. The user interface 500 may be an example of an interface that supports calculating insights (or definitions) based on receiving a real-time data stream, and the user interface 500 may be supported by aspects of FIG. 1, such as a cloud platform 115. As illustrated, the user interface 500 may display code for calculating an insight for a real-time data stream captured for a time period. As depicted herein, the system supporting the user interface 500 may receive a user input including a definition for one or more data metrics configured for a tenant in a multi-tenant system and one or more rules corresponding to an action. The system may receive a real-time data stream associated with the tenant in the multi-tenant system (as depicted with reference to FIG. 4). The user interface 500 may support ingesting the real-time data stream into the definition for the one or more data metrics. That is, the calculated insight may operate on the ingested real-time data stream (e.g., according to the definition of the insight) to determine whether to perform one or more actions (e.g., triggered events).

Figure 6:
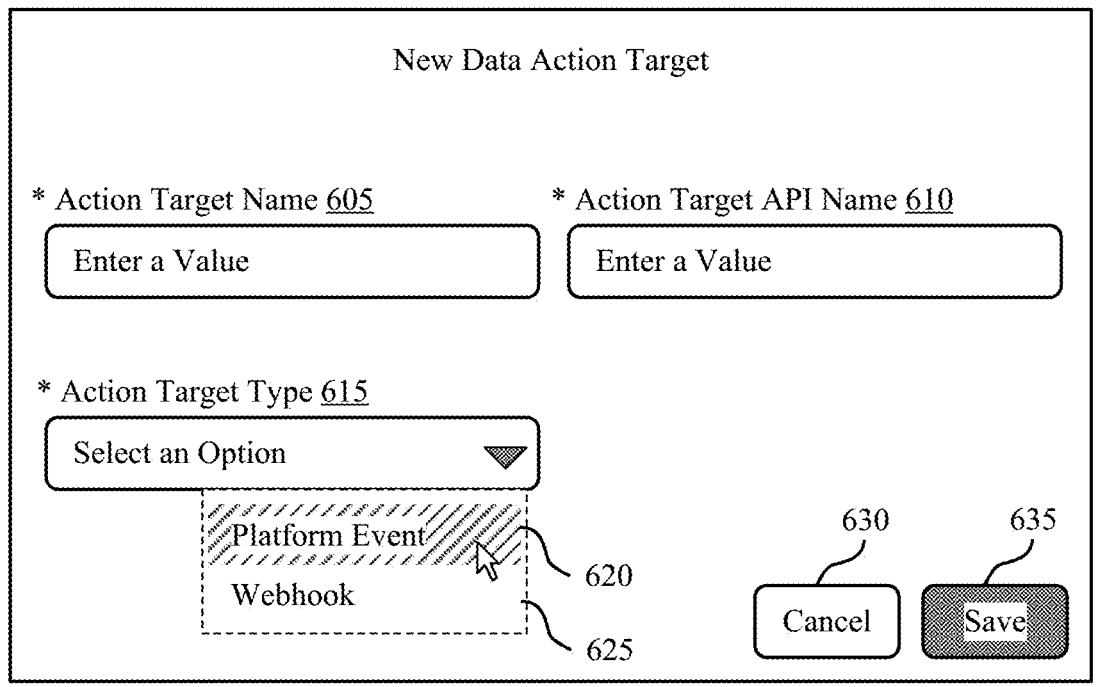

FIG. 6 illustrates an example of a user interface 600 that supports rule evaluation for a real-time data stream in accordance with aspects of the present disclosure. The user interface 600 may be an example of an interface that supports creation of an action target by a user. Once an action target is created, a generated insight (or definition) may indicate the action target in order to trigger the corresponding action based on the insight. The user interface 600 may be supported by aspects of FIG. 1, such as a cloud platform 115.

As depicted with reference to FIGS. 4 and 5, an insight may be generated based on ingesting a real-time data stream into a definition for one or more data metrics. A system supporting the user interface 600 may evaluate one or more rules related to an action based on ingesting the real-time data stream into the definition for the one or more data metrics. The system may then trigger the action based on evaluating the one or more rules. As illustrated, the user interface 600 may support a user defining an action target name 605 (e.g., for referencing the action), an action target API name 610 (e.g., for calling an API to perform the action), and an action target type 615 (e.g., indicating a type of event for the action). For example, the action target type 615 may be a platform event 620 (e.g., an event within a data platform, such as modifying data), a webhook event 625 (e.g., triggering a webhook to retrieve data), or both. The user interface 600 may be used by a user to define an action and a target for an action based on a calculated insight. The user may use a first affordance 630 to cancel creation of the action target, or the user may use a second affordance 635 to save a new action target (e.g., with the values input into the fields of the user interface 600). As such, users may create custom action targets, which may be specific to a tenant associated with the user creating the custom action target.

Figure 7:
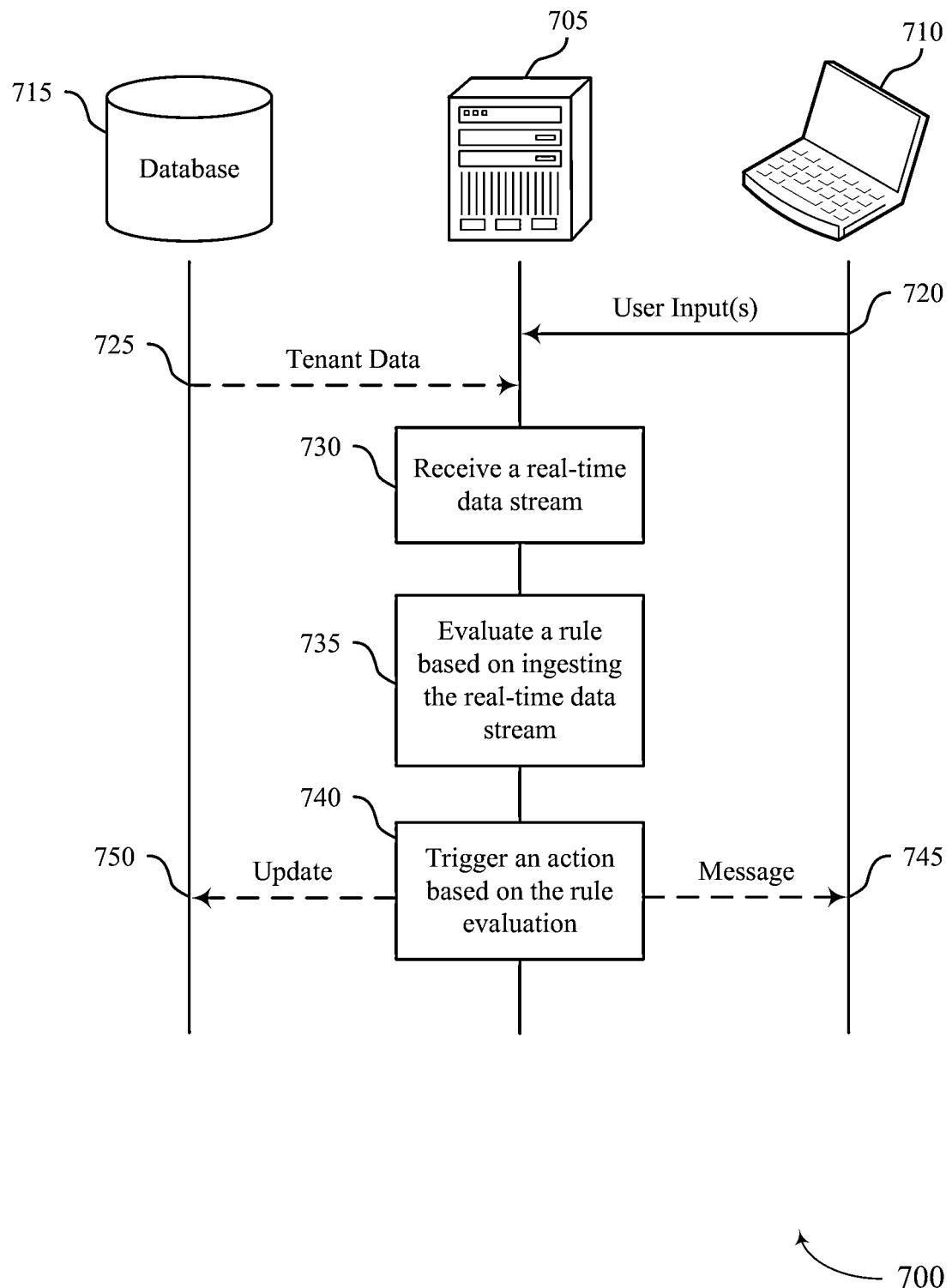
FIG. 7 illustrates an example of a process flow that supports rule evaluation for a real-time data stream in accordance with aspects of the present disclosure.

FIG. 7 illustrates an example of a process flow 700 that supports rule evaluation for a real-time data stream in accordance with aspects of the present disclosure. The process flow 700 may implement aspects of the system 100, the system 200, or the architecture 300 as described with reference to FIGS. 1 through 3. The process flow 700 may include a processing device 705 (e.g., an application server or another processing device), a user device 710, and a database 715 (e.g., a component of a multi-tenant database system). The processing device 705 may be an example of a server, server cluster, application server, database server, worker server, cloud-based component, virtual machine, container, database, user device, or system of devices capable of processing data, or one or more components of such a processing device. In the following description of the process flow 700, the operations may be performed in different orders or at different times. Some operations may also be left out of the process flow 700, or other operations may be added. Although the processing device 705, the user device 710, and the database 715 are shown performing the operations of the process flow 700, some aspects of some operations may be performed by one or more other devices.

At 720, the processing device 705 (e.g., an application server or other processing device or system) may receive one or more inputs. In some examples, the inputs may be user inputs from the user device 710. For example, the user inputs may be received via a user interface of the user device 710, such as a user interface 400, a user interface 500, or a user interface 600 as described herein with reference to FIGS. 4 through 6.

The processing device 705 may receive a user input indicating a data streaming source, a data metric configured for a tenant of a multi-tenant database system, a rule associated with the data metric, an action to trigger based on the rule, or any combination thereof. The data streaming source may be associated with the database 715 (e.g., a database storing tenant data for one or more tenants of the multi-tenant database system). The data streaming source may be an example of any system, application, or service supporting sending data in real-time (or pseudo-real-time) to the processing device 705 for processing. For example, the data streaming source may stream data in any format to the processing device 705 for ingestion. In some examples, the inputs may include a selection of a target for an action. The target may be any application, system, service, database, or user device for which the processing device 705 may trigger an event or action. In some examples, the target for the action may be an API, a webhook, or another entity configured to support interactions with another system or service.

In some examples, at 725, the processing device 705 may retrieve tenant data from the database 715. For example, the database 715 may store multiple user profiles, and the processing device 705 may retrieve one or more user profiles associated with a rule for evaluation (e.g., an insight). A user profile may include user data unified across a set of multiple user identifiers. For example, the database 715 may unify data corresponding to an email address, a phone number, a user account, an identification number, a biometric parameter, a device identifier, an internet cookie, or any combination of these or other user identifiers associated with the same user (e.g., the same person). In this way, the database 715 may determine which data corresponds to a same person, not just a same user identifier. In some cases, the processing device 705 may additionally, or alternatively, retrieve other tenant data from the database 715, such as data corresponding to custom objects for the tenant, custom rules for the tenant, actions supported by the tenant, user segmentation information for the tenant (e.g., indicating different groups of customers, users, or the like), or any combination thereof. The processing device 705 may maintain tenant security by keep data for different tenants separate and hidden from other tenants.

At 730, the processing device 705 may receive, from the data streaming source associated with the database, a real-time data stream. The real-time data stream may include information corresponding to the data metric configured for the tenant of the multi-tenant database system. For example, the data in the real-time data stream may include the indicated data metric. For example, the indicated data metric may be a customer review score, and the real-time data stream may capture customer review scores for analysis. The real-time data stream may also be associated with a first user profile stored at the database. For example, the real-time data stream may include data associated with a first user, such as a specific customer, a specific administrative user, a specific sales representative, or the like. In some cases, the database 715, the processing device 705, or both may store at least a portion of the real-time data stream in cache memory of the multi-tenant database system. In some cases, the processing device 705 may receive a user input indicating a subscriber key for the data streaming source, and the information of the received real-time data stream may further correspond to the subscriber key. For example, a user running the rule for the real-time stream may be assigned a subscriber key for a specific streaming source and may use the subscriber key to receive a data stream specific to that user (e.g., refraining from streaming other data not related to the user to improve security and reduce overhead).

At 735, the processing device 705 may ingest the real-time data stream in order to evaluate the rule. In some examples, the rule may include an insight (e.g., if a customer review score is below a threshold score, the tenant should notify a sales representative to reach out to the customer). The insight may include a definition of the rule (e.g., including the threshold score and the logic for using the threshold score), the relevant data metrics (e.g., customer review scores) and an action to trigger (e.g., notifying the sales representative). The processing device 705 may evaluate the rule based on ingesting the real-time data stream including the information corresponding to the data metric. In some cases, the processing device 705 may execute an insight on the real-time data stream via an ingestion engine to evaluate the rule.

At 740, the processing device 705 may trigger the action based on the evaluated rule. In some examples, at 745, the processing device 705 may send a message to a user device 710 (e.g., the user device 710 associated with the first user profile) in response to at least a portion of the real-time data stream. In some examples, the processing device 705 may trigger a set of processes (e.g., a user journey) according to a process flow (e.g., a business flow) defined for the tenant of the multi-tenant database system. In some examples, at 750, the processing device 705 may update the database 715 based on evaluating the rule. For example, the processing device 705 may modify a data object in the database, create a data object in the database, delete a data object from the database, or any combination thereof. In some examples, the processing device 705 may determine a segment of users (e.g., may perform segmentation on users, customers, groups, clients) based on the evaluated rule. The processing device 705 may perform an action for a full segment of users, such as sending the message to multiple user devices associated with the segment of users. In some examples, the processing device 705 may trigger an alert (e.g., an example of the message) based on the evaluated rule. In some examples, the processing device 705 may update a user profile based on the evaluated rule. For example, the processing device 705 may add an additional user identifier to the set of user identifiers for a specific user profile, remove a user identifier from the set of user identifiers, modify user data unified for the user profile, or any combination thereof.

In some cases, a user may modify, add, or remove rules, insights, actions, or any combination thereof. For example, the processing device 705 may receive a user input modifying a rule and may publish an update to the rule in response to the user input. Evaluating the rule may be based on the published version of the rule (e.g., including the update). Additionally, or alternatively, the processing device 705 may receive a user input defining an additional rule associated with the real-time data stream, and the processing device 705 may further evaluate the additional rule based on ingesting the real-time data stream. That is, the processing device 705 may evaluate multiple rules based on a single ingestion of the real-time data stream to improve processing overhead and latency.

Figure 8:
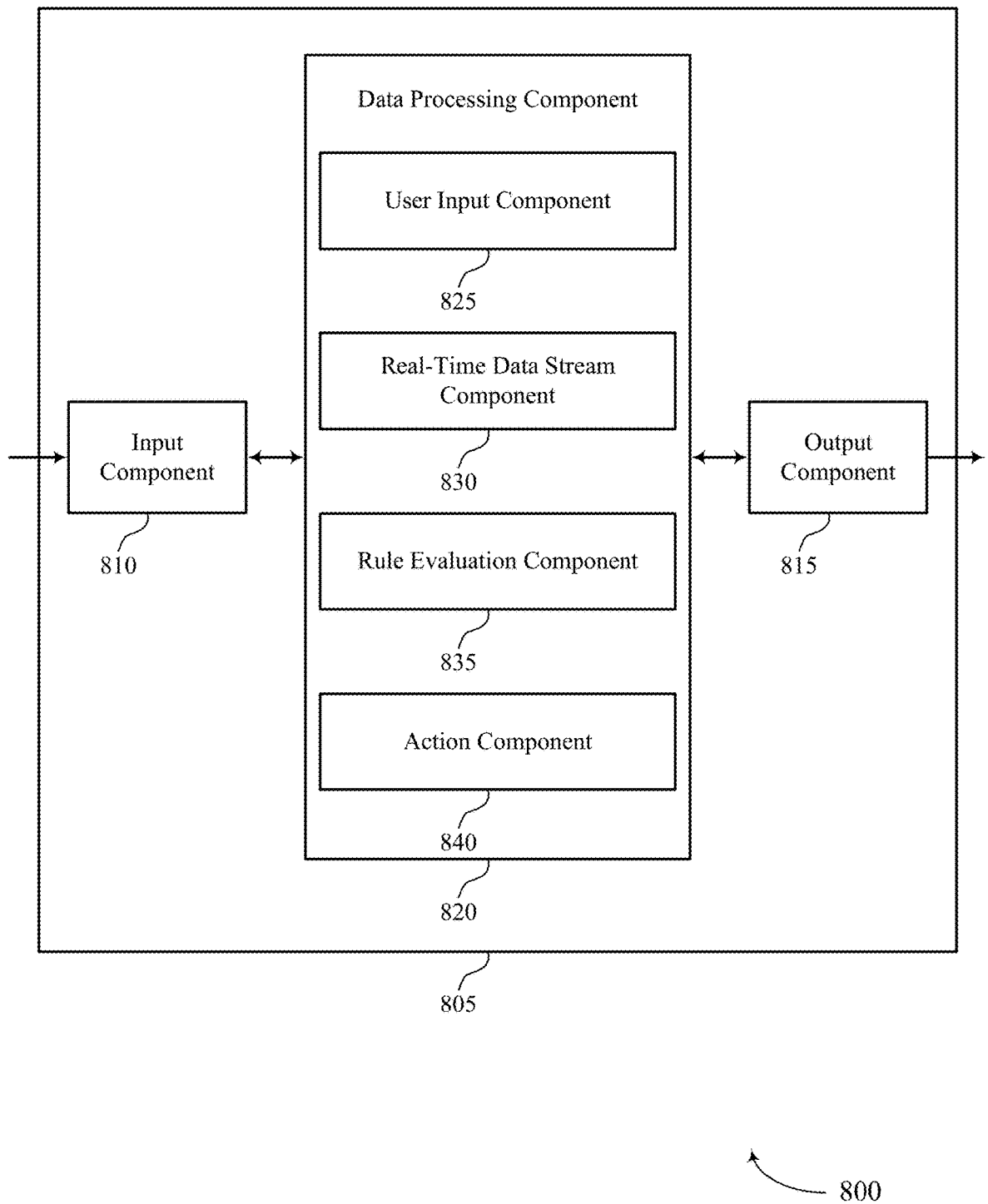
FIG. 8 shows a block diagram of an apparatus that supports rule evaluation for a real-time data stream in accordance with aspects of the present disclosure.

FIG. 8 shows a block diagram 800 of a device 805 that supports rule evaluation for a real-time data stream in accordance with aspects of the present disclosure. The device 805 may include an input component 810, an output component 815, and a data processing component 820. The device 805 may also include a processor. The device 805 may be an example of a computing device, such as an application server or any other processing device or system. For example, the device 805 may be an application server, a server, a server cluster, a database server, a worker server, a cloud-based component, a virtual machine, a container, a database, a user device, or a system of devices capable of processing data. Each component of the device 805 may be in communication with one another (e.g., via one or more buses).

The input component 810 may manage input signals for the device 805. For example, the input component 810 may identify input signals based on an interaction with a modem, a keyboard, a mouse, a touchscreen, or a similar device. These input signals may be associated with user input or processing at other components or devices. In some cases, the input component 810 may utilize an operating system such as iOS®, ANDROID®, MS-DOS®, MS-WINDOWS®, OS/2®, UNIX®, LINUX®, or another known operating system to handle input signals. The input component 810 may send aspects of these input signals to other components of the device 805 for processing. For example, the input component 810 may transmit input signals to the data processing component 820 to support rule evaluation for a real-time data stream. In some cases, the input component 810 may be a component of an input/output (I/O) controller 1010 as described with reference to FIG. 10.

The output component 815 may manage output signals for the device 805. For example, the output component 815 may receive signals from other components of the device 805, such as the data processing component 820, and may transmit these signals to other components or devices. In some examples, the output component 815 may transmit output signals for display in a user interface, for storage in a database or data store, for further processing at a server or server cluster, or for any other processes at any number of devices or systems. In some cases, the output component 815 may be a component of an I/O controller 1010 as described with reference to FIG. 10.

For example, the data processing component 820 may include a user input component 825, a real-time data stream component 830, a rule evaluation component 835, an action component 840, or any combination thereof. In some examples, the data processing component 820, or various components thereof, may be configured to perform various operations (e.g., receiving, monitoring, transmitting) using or otherwise in cooperation with the input component 810, the output component 815, or both. For example, the data processing component 820 may receive information from the input component 810, send information to the output component 815, or be integrated in combination with the input component 810, the output component 815, or both to receive information, transmit information, or perform various other operations as described herein.

The data processing component 820 may support data processing at an application server in accordance with examples as disclosed herein. The user input component 825 may be configured to support receiving a user input indicating a data streaming source, a data metric configured for a tenant of a multi-tenant database system, a rule associated with the data metric, and an action to trigger based on the rule, where the data streaming source is associated with a database storing a set of multiple user profiles, a user profile including user data unified across a set of multiple user identifiers. The real-time data stream component 830 may be configured to support receiving, from the data streaming source associated with the database, a real-time data stream including information corresponding to the data metric configured for the tenant of the multi-tenant database system, the real-time data stream associated with a first user profile stored at the database. The rule evaluation component 835 may be configured to support evaluating the rule based on ingesting the real-time data stream including the information corresponding to the data metric. The action component 840 may be configured to support triggering the action based on the evaluated rule, where triggering the action may involve sending a message to a user device associated with the first user profile in response to at least a portion of the real-time data stream.

Figure 9:
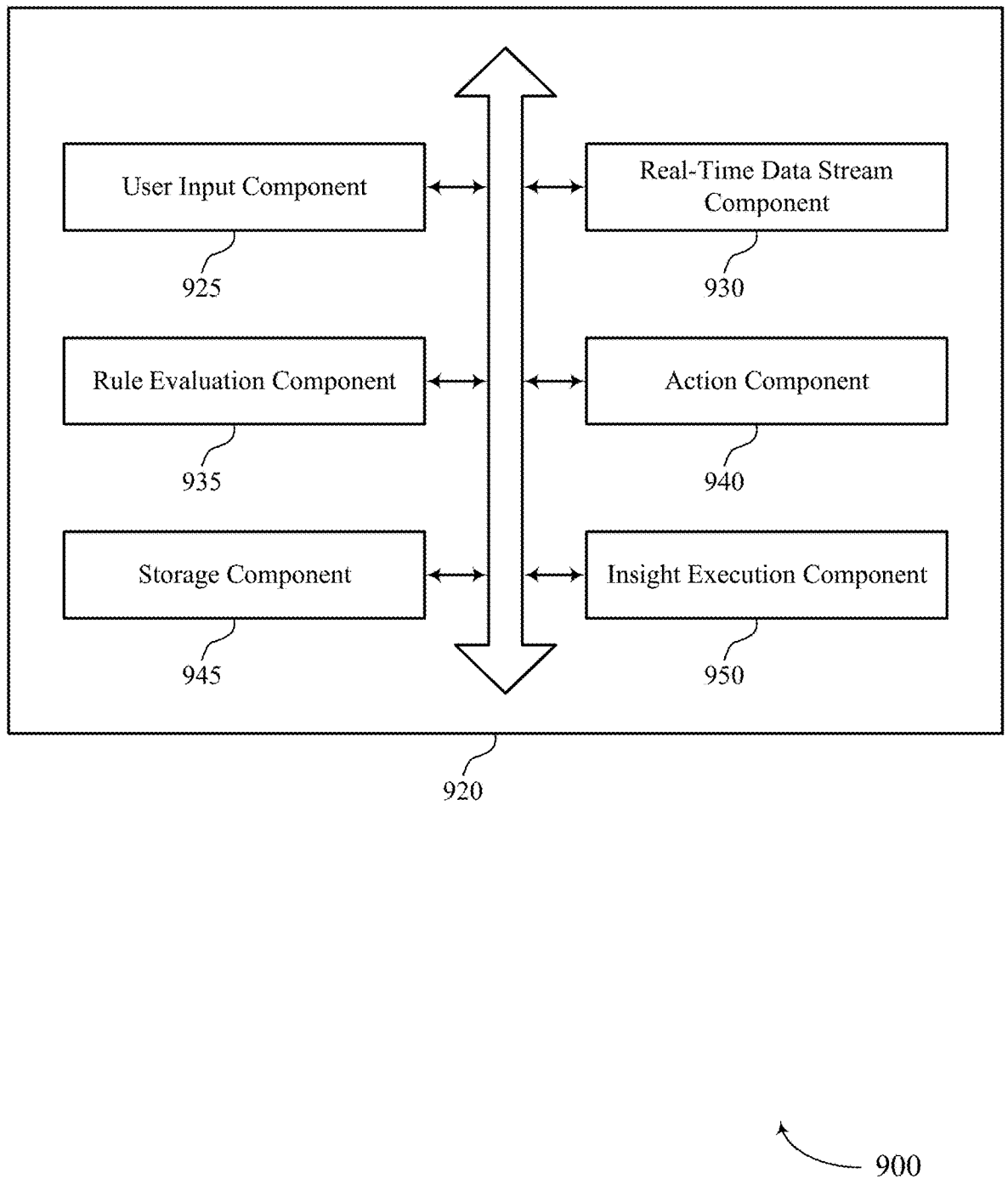
FIG. 9 shows a block diagram of a data processing component that supports rule evaluation for a real-time data stream in accordance with aspects of the present disclosure.

FIG. 9 shows a block diagram 900 of a data processing component 920 that supports rule evaluation for a real-time data stream in accordance with aspects of the present disclosure. The data processing component 920 may be an example of aspects of a data processing component 820 as described herein. The data processing component 920, or various components thereof, may perform various aspects of rule evaluation for real-time data streams as described herein. For example, the data processing component 920 may include a user input component 925, a real-time data stream component 930, a rule evaluation component 935, an action component 940, a storage component 945, an insight execution component 950, or any combination thereof. Each of these components may communicate, directly or indirectly, with one another (e.g., via one or more buses).

The data processing component 920 may support data processing at an application server in accordance with examples as disclosed herein. The user input component 925 may be configured to support receiving user input indicating a data stream, a data metric configured for a tenant of a multi-tenant database system, and at least one of a rule associated with the data metric and a trigger based on the data metric. The data stream may be associated with a database operating in association with a set of multiple user profiles, a user profile including user data unified across a set of multiple user identifiers. The real-time data stream component 930 may be configured to support receiving, from the data stream associated with the database, an at least near real-time data stream including information corresponding to the data metric configured for the tenant of the multi-tenant database system, the at least near real-time data stream associated with a first user profile stored at the database. The rule evaluation component 935 may be configured to support evaluating at least one of the rule or the trigger based on ingesting the at least near real-time data stream including the information corresponding to the data metric. The action component 940 may be configured to support performing an action based on the evaluated rule or the evaluated trigger, where the action may involve sending a message to a user device associated with the first user profile in response to at least a portion of the at least near real-time data stream.

In some examples, the action component 940 may be configured to support receiving a second user input including a selection of a target for the action, where performing the action may involve performing the action at the target. In some examples, the insight execution component 950 may be configured to support executing an insight on the at least near real-time data stream via an ingestion engine to evaluate at least one of the rule or the trigger.

In some examples, the storage component 945 may be configured to support storing at least a second portion of the at least near real-time data stream in a cache memory of the multi-tenant database system.

In some examples, to perform the action, the action component 940 may be configured to support performing a set of processes according to a process flow defined for the tenant of the multi-tenant database system.

In some examples, the user input component 925 may be configured to support receiving a third user input indicating a subscriber key for the data stream, where the information of the at least near real-time data stream further corresponds to the subscriber key. In some examples, the user input component 925 may be configured to support receiving a fourth user input modifying the rule. In some such examples, the rule evaluation component 935 may be configured to support publishing an update to the rule in response to the fourth user input, where evaluating at least the rule may be further based on the published update to the rule. In some examples, the user input component 925 may be configured to support receiving a fifth user input defining an additional rule associated with the at least near real-time data stream. In some such examples, the rule evaluation component 935 may be configured to support further evaluating the additional rule based on ingesting the at least near real-time data stream.

In some examples, to perform the action, the action component 940 may be configured to support modifying a first data object corresponding to the tenant and stored at the database based on the evaluated rule or the evaluated trigger, creating a second data object corresponding to the tenant at the database based on the evaluated rule or the evaluated trigger, deleting a third data object corresponding to the tenant from the database based on the evaluated rule or the evaluated trigger, or any combination thereof.

In some examples, to perform the action, the action component 940 may be configured to support determining a segment of users based on the evaluated rule or the evaluated trigger, where the segment of users includes at least the first user profile, and sending the message to a set of multiple user devices associated with the segment of users in response to at least the portion of the at least near real-time data stream. In some examples, to perform the action, the action component 940 may be configured to support triggering an alert based on the evaluated rule or the evaluated trigger, where the message indicates the alert.

In some examples, to perform the action, the action component 940 may be configured to support updating the user profile based on the evaluated rule or the evaluated trigger, where updating the user profile may involve adding an additional user identifier to the set of multiple user identifiers, removing a user identifier from the set of multiple user identifiers, modifying the user data unified across the set of multiple user identifiers, or any combination thereof. In some examples, the set of multiple user identifiers may correspond to an email address, a phone number, a user account, an identification number, a biometric parameter, a device identifier, an internet cookie, or any combination thereof.

Figure 10:
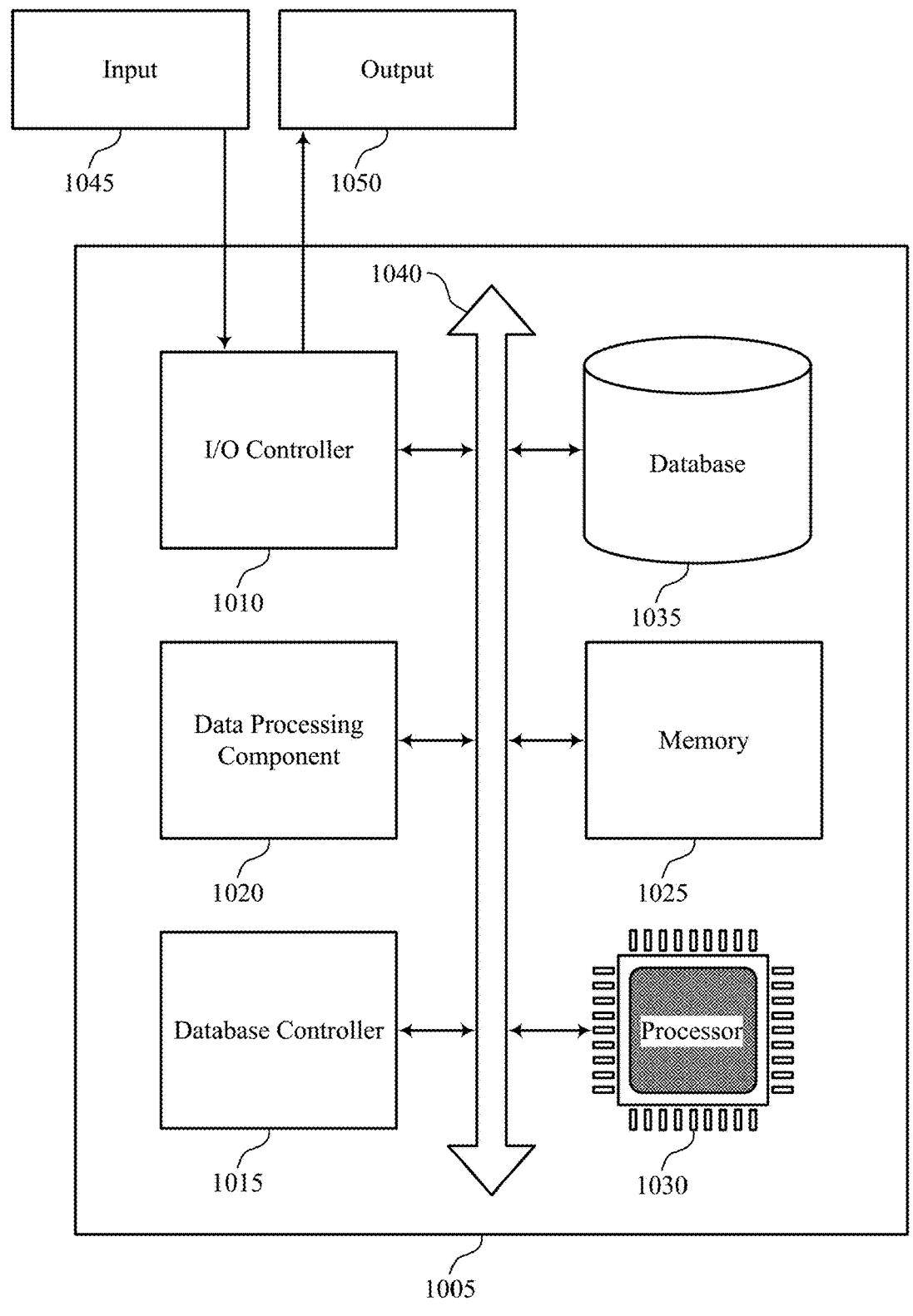
FIG. 10 shows a diagram of a system including a device that supports rule evaluation for a real-time data stream in accordance with aspects of the present disclosure.

FIG. 10 shows a diagram of a system 1000 including a device 1005 that supports rule evaluation for a real-time data stream in accordance with aspects of the present disclosure. The device 1005 may be an example of or include the components of a device 805 as described herein. The device 1005 may include components for bi-directional data communications including components for transmitting and receiving communications, such as a data processing component 1020, an I/O controller 1010, a database controller 1015, a memory 1025, a processor 1030, and a database 1035. These components may be in electronic communication or otherwise coupled (e.g., operatively, communicatively, functionally, electronically, electrically) via one or more buses (e.g., a bus 1040).

The I/O controller 1010 may manage input signals 1045 and output signals 1050 for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In other cases, the I/O controller 1010 may represent or interact with a modem, a keyboard, a mouse, a touchscreen, or a similar device. In some cases, the I/O controller 1010 may be implemented as part of a processor 1030. In some examples, a user may interact with the device 1005 via the I/O controller 1010 or via hardware components controlled by the I/O controller 1010.

The database controller 1015 may manage data storage and processing in a database 1035. In some cases, a user may interact with the database controller 1015. In other cases, the database controller 1015 may operate automatically without user interaction. The database 1035 may be an example of a single database, a distributed database, multiple distributed databases, a data store, a data lake, or an emergency backup database.

Memory 1025 may include random-access memory (RAM) and read-only memory (ROM). The memory 1025 may store computer-readable, computer-executable software including instructions that, when executed, cause the processor 1030 to perform various functions described herein. In some cases, the memory 1025 may contain, among other things, a basic I/O system (BIOS) which may control basic hardware or software operation such as the interaction with peripheral components or devices.

The processor 1030 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting rule evaluation for real-time data streams).

The data processing component 1020 may support data processing at an application server in accordance with examples as disclosed herein. For example, the data processing component 1020 may be configured to support receiving user input indicating a data stream, a data metric configured for a tenant of a multi-tenant database system, and at least one of a rule associated with the data metric and a trigger based at least in part on the data metric, wherein the data stream is associated with a database operating in association with a plurality of user profiles, a user profile comprising user data unified across a plurality of user identifiers. The data processing component 1020 may be configured to support receiving, from the data stream associated with the database, an at least near real-time data stream comprising information corresponding to the data metric configured for the tenant of the multi-tenant database system, the at least near real-time data stream associated with a first user profile stored at the database. The data processing component 1020 may be configured to support evaluating at least one of the rule or the trigger based at least in part on ingesting the at least near real-time data stream comprising the information corresponding to the data metric. The data processing component 1020 may be configured to support performing an action based at least in part on the evaluated rule or the evaluated trigger, wherein the action comprises sending a message to a user device associated with the first user profile in response to at least a portion of the at least near real-time data stream.

By including or configuring the data processing component 1020 in accordance with examples as described herein, the device 1005 may support techniques for improved user experience.

Figure 11:
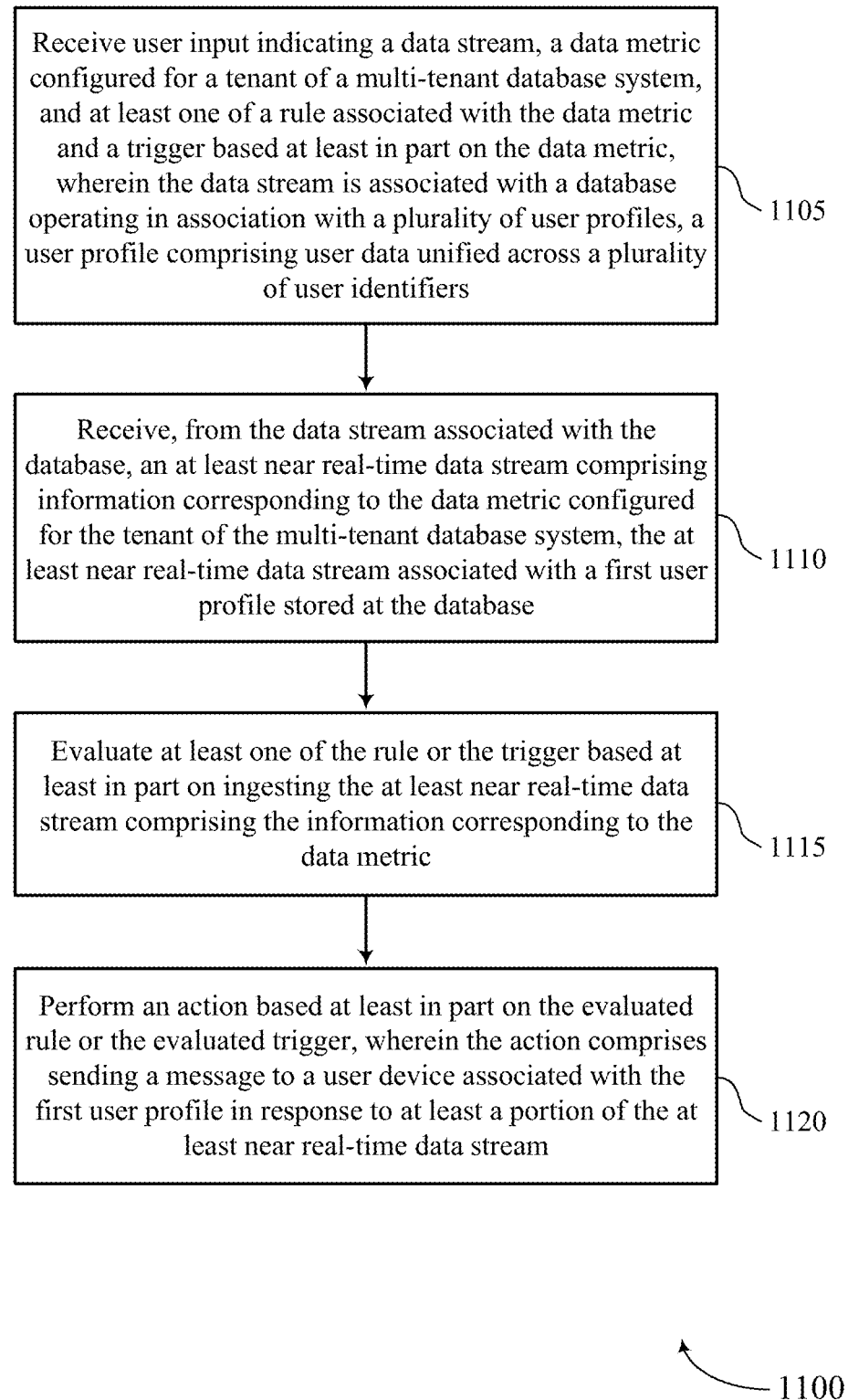
FIG. 11 shows a flowchart illustrating a method that supports rule evaluation for a real-time data stream in accordance with aspects of the present disclosure.

FIG. 11 shows a flowchart illustrating a method 1100 that supports rule evaluation for real-time data stream in accordance with aspects of the present disclosure. The operations of the method 1100 may be implemented by an application server (e.g., or any processing device, such as a server, server cluster, database server, worker server, cloud-based component, virtual machine, container, database, user device, or system of devices capable of processing data) or its components as described herein. For example, the operations of the method 1100 may be performed by an application server as described with reference to FIGS. 1 through 10. In some examples, an application server may execute a set of instructions to control the functional elements of the application server to perform the described functions. Additionally, or alternatively, the application server may perform aspects of the described functions using special-purpose hardware.

At 1105, the method may include receiving user input indicating a data stream (e.g., a data streaming source for the data stream), a data metric configured for a tenant of a multi-tenant database system, and at least one of a rule associated with the data metric and a trigger based on the data metric. The data stream may be associated with a database operating in association with (e.g., storing) a set of multiple user profiles, where a user profile includes user data unified across multiple user identifiers. The operations of 1105 may be performed in accordance with examples as disclosed herein. In some examples, aspects of the operations of 1105 may be performed by a user input component 925 as described with reference to FIG. 9.

At 1110, the method may include receiving, from the data stream associated with the database, an at least near real-time data stream (e.g., a real-time data stream or a pseudo-real-time data stream) including information corresponding to the data metric configured for the tenant of the multi-tenant database system. The at least near real-time data stream may be associated with a first user profile stored at the database. The operations of 1110 may be performed in accordance with examples as disclosed herein. In some examples, aspects of the operations of 1110 may be performed by a real-time data stream component 930 as described with reference to FIG. 9.

At 1115, the method may include evaluating at least one of the rule or the trigger based on ingesting the at least near real-time data stream including the information corresponding to the data metric. The operations of 1115 may be performed in accordance with examples as disclosed herein. In some examples, aspects of the operations of 1115 may be performed by a rule evaluation component 935 as described with reference to FIG. 9.

At 1120, the method may include performing an action based on the evaluated rule, the evaluated trigger, or both. In some examples, the action may involve sending a message to a user device associated with the first user profile in response to at least a portion of the at least near real-time data stream. The operations of 1120 may be performed in accordance with examples as disclosed herein. In some examples, aspects of the operations of 1120 may be performed by an action component 940 as described with reference to FIG. 9.

A method for data processing at an application server is described. The method may include receiving user input indicating a data stream, a data metric configured for a tenant of a multi-tenant database system, and at least one of a rule associated with the data metric and a trigger based at least in part on the data metric, wherein the data stream is associated with a database operating in association with a plurality of user profiles, a user profile comprising user data unified across a plurality of user identifiers. The method may further include receiving, from the data stream associated with the database, an at least near real-time data stream comprising information corresponding to the data metric configured for the tenant of the multi-tenant database system, the at least near real-time data stream associated with a first user profile stored at the database. The method may include evaluating at least one of the rule or the trigger based at least in part on ingesting the at least near real-time data stream comprising the information corresponding to the data metric and performing an action based at least in part on the evaluated rule or the evaluated trigger, wherein the action comprises sending a message to a user device associated with the first user profile in response to at least a portion of the at least near real-time data stream.

An apparatus for data processing at an application server is described. The apparatus may include a processor, memory coupled with the processor, and instructions stored in the memory. The instructions may be executable by the processor to cause the apparatus to receive user input indicating a data stream, a data metric configured for a tenant of a multi-tenant database system, and at least one of a rule associated with the data metric and a trigger based at least in part on the data metric, wherein the data stream is associated with a database operating in association with a plurality of user profiles, a user profile comprising user data unified across a plurality of user identifiers. The instructions may be further executable by the processor to cause the apparatus to receive, from the data stream associated with the database, an at least near real-time data stream comprising information corresponding to the data metric configured for the tenant of the multi-tenant database system, the at least near real-time data stream associated with a first user profile stored at the database. The instructions may be further executable by the processor to cause the apparatus to evaluate at least one of the rule or the trigger based at least in part on ingesting the at least near real-time data stream comprising the information corresponding to the data metric and perform an action based at least in part on the evaluated rule or the evaluated trigger, wherein the action comprises sending a message to a user device associated with the first user profile in response to at least a portion of the at least near real-time data stream.

Another apparatus for data processing at an application server is described. The apparatus may include means for receiving user input indicating a data stream, a data metric configured for a tenant of a multi-tenant database system, and at least one of a rule associated with the data metric and a trigger based at least in part on the data metric, wherein the data stream is associated with a database operating in association with a plurality of user profiles, a user profile comprising user data unified across a plurality of user identifiers. The apparatus may further include means for receiving, from the data stream associated with the database, an at least near real-time data stream comprising information corresponding to the data metric configured for the tenant of the multi-tenant database system, the at least near real-time data stream associated with a first user profile stored at the database. The apparatus may further include means for evaluating at least one of the rule or the trigger based at least in part on ingesting the at least near real-time data stream comprising the information corresponding to the data metric and means for performing an action based at least in part on the evaluated rule or the evaluated trigger, wherein the action comprises sending a message to a user device associated with the first user profile in response to at least a portion of the at least near real-time data stream.

A non-transitory computer-readable medium storing code for data processing at an application server is described. The code may include instructions executable by a processor to receive user input indicating a data stream, a data metric configured for a tenant of a multi-tenant database system, and at least one of a rule associated with the data metric and a trigger based at least in part on the data metric, wherein the data stream is associated with a database operating in association with a plurality of user profiles, a user profile comprising user data unified across a plurality of user identifiers. The code may include instructions further executable by the processor to receive, from the data stream associated with the database, an at least near real-time data stream comprising information corresponding to the data metric configured for the tenant of the multi-tenant database system, the at least near real-time data stream associated with a first user profile stored at the database. The code may include instructions further executable by the processor to evaluate at least one of the rule or the trigger based at least in part on ingesting the at least near real-time data stream comprising the information corresponding to the data metric and perform an action based at least in part on the evaluated rule or the evaluated trigger, wherein the action comprises sending a message to a user device associated with the first user profile in response to at least a portion of the at least near real-time data stream.

Some examples of the method, apparatuses, and non-transitory computer-readable medium described herein may further include operations, features, means, or instructions for receiving a second user input comprising a selection of a target for the action, wherein performing the action comprises performing the action at the target.

Some examples of the method, apparatuses, and non-transitory computer-readable medium described herein may further include operations, features, means, or instructions for executing an insight on the at least near real-time data stream via an ingestion engine to evaluate at least one of the rule or the trigger.

Some examples of the method, apparatuses, and non-transitory computer-readable medium described herein may further include operations, features, means, or instructions for storing at least a second portion of the at least near real-time data stream in a cache memory of the multi-tenant database system.

In some examples of the method, apparatuses, and non-transitory computer-readable medium described herein, performing the action may further include operations, features, means, or instructions for performing a set of processes according to a process flow defined for the tenant of the multi-tenant database system.

Some examples of the method, apparatuses, and non-transitory computer-readable medium described herein may further include operations, features, means, or instructions for receiving a third user input indicating a subscriber key for the data stream, wherein the information of the at least near real-time data stream further corresponds to the subscriber key.

Some examples of the method, apparatuses, and non-transitory computer-readable medium described herein may further include operations, features, means, or instructions for receiving a fourth user input modifying the rule and publishing an update to the rule in response to the fourth user input, wherein evaluating at least the rule is further based at least in part on the published update to the rule.

Some examples of the method, apparatuses, and non-transitory computer-readable medium described herein may further include operations, features, means, or instructions for receiving a fifth user input defining an additional rule associated with the at least near real-time data stream and further evaluating the additional rule based at least in part on ingesting the at least near real-time data stream.

In some examples of the method, apparatuses, and non-transitory computer-readable medium described herein, performing the action may further include operations, features, means, or instructions for modifying a first data object corresponding to the tenant and stored at the database based at least in part on the evaluated rule or the evaluated trigger, creating a second data object corresponding to the tenant at the database based at least in part on the evaluated rule or the evaluated trigger, deleting a third data object corresponding to the tenant from the database based at least in part on the evaluated rule or the evaluated trigger, or any combination thereof.

In some examples of the method, apparatuses, and non-transitory computer-readable medium described herein, performing the action may further include operations, features, means, or instructions for determining a segment of users based at least in part on the evaluated rule or the evaluated trigger, wherein the segment of users comprises at least the first user profile and sending the message to a plurality of user devices associated with the segment of users in response to at least the portion of the at least near real-time data stream.

In some examples of the method, apparatuses, and non-transitory computer-readable medium described herein, performing the action may further include operations, features, means, or instructions for triggering an alert based at least in part on the evaluated rule or the evaluated trigger, wherein the message indicates the alert.

In some examples of the method, apparatuses, and non-transitory computer-readable medium described herein, performing the action may further include operations, features, means, or instructions for updating the user profile based at least in part on the evaluated rule or the evaluated trigger, wherein updating the user profile comprises adding an additional user identifier to the plurality of user identifiers, removing a user identifier from the plurality of user identifiers, modifying the user data unified across the plurality of user identifiers, or any combination thereof.

In some examples of the method, apparatuses, and non-transitory computer-readable medium described herein, the plurality of user identifiers corresponds to an email address, a phone number, a user account, an identification number, a biometric parameter, a device identifier, an internet cookie, or any combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at an application server, comprising:

receiving, via a first user interface of a first user device, a first user input indicating a data stream, a second user input indicating a subscriber key for a data streaming source of the data stream, a third user input indicating a data metric configured for a tenant of a multi-tenant database system, and a fourth user input indicating at least one of a rule associated with the data metric and a trigger based at least in part on the data metric, wherein the data stream is associated with a database operating in association with a plurality of user profiles, a user profile comprising user data unified across a plurality of user identifiers;

receiving, from the data streaming source, an at least near real-time data stream comprising information specific to the subscriber key and corresponding to the data metric configured for the tenant of the multi-tenant database system based at least in part on the first user input, the second user input, and the third user input, the at least near real-time data stream associated with a first user profile stored at the database;

evaluating at least one of the rule or the trigger based at least in part on the fourth user input and ingesting the at least near real-time data stream comprising the information;

creating an event data object based at least in part on the evaluated rule or the evaluated trigger, wherein the created event data object is stored for the tenant as a record-level object in the database and is associated with an alert; and performing an action based at least in part on the evaluated rule or the evaluated trigger, wherein the action comprises sending a notification message associated with the alert for display via a second user interface of a second user device associated with the first user profile in response to at least a portion of the at least near real-time data stream.

2. The method of claim 1, further comprising:

receiving a fifth user input comprising a selection of a target for the action, wherein performing the action comprises performing the action at the target.

3. The method of claim 1, further comprising:

executing an insight on the at least near real-time data stream via an ingestion engine to evaluate at least one of the rule or the trigger.

4. The method of claim 1, further comprising:
storing at least a second portion of the at least near real-time data stream in a cache memory of the multi-tenant database system.

5. The method of claim 1, wherein performing the action further comprises:
performing a set of processes according to a process flow defined for the tenant of the multi-tenant database system.

6. The method of claim 1, further comprising:
receiving a sixth user input modifying the rule; and
publishing an update to the rule in response to the sixth user input, wherein evaluating at least the rule is further based at least in part on the published update to the rule.

7. The method of claim 1, further comprising:
receiving a seventh user input defining an additional rule associated with the at least near real-time data stream; and
further evaluating the additional rule based at least in part on ingesting the at least near real-time data stream.

8. The method of claim 1, wherein performing the action further comprises:
modifying a first data object corresponding to the tenant and stored at the database based at least in part on the evaluated rule or the evaluated trigger;
creating a second data object corresponding to the tenant at the database based at least in part on the evaluated rule or the evaluated trigger;
deleting a third data object corresponding to the tenant from the database based at least in part on the evaluated rule or the evaluated trigger;
or any combination thereof.

9. The method of claim 1, wherein performing the action further comprises:
determining a segment of users based at least in part on the evaluated rule or the evaluated trigger, wherein the segment of users comprises at least the first user profile; and
sending the notification message to a plurality of user devices associated with the segment of users in response to at least the portion of the at least near real-time data stream.

10. The method of claim 1, wherein performing the action further comprises:
triggering the alert based at least in part on the evaluated rule or the evaluated trigger.

11. The method of claim 1, wherein performing the action further comprises:
updating the user profile based at least in part on the evaluated rule or the evaluated trigger, wherein updating the user profile comprises adding an additional user identifier to the plurality of user identifiers, removing a user identifier from the plurality of user identifiers, modifying the user data unified across the plurality of user identifiers, or any combination thereof.

12. The method of claim 1, wherein the plurality of user identifiers corresponds to an email address, a phone number, a user account, an identification number, a biometric parameter, a device identifier, an internet cookie, or any combination thereof.

13. The method of claim 1, wherein performing the action comprises:
triggering a webhook in response to the creating the event data object in the database, wherein the notification message associated with the alert is sent for display using the triggered webhook.

14. An apparatus for data processing at an application server, comprising:
at least one processor;
at least one memory coupled with the at least one processor; and
instructions stored in the at least one memory and executable by the at least one processor to cause the apparatus to:
receive, via a first user interface of a first user device, a first user input indicating a data stream, a second user input indicating a subscriber key for a data streaming source of the data stream, a third user input indicating a data metric configured for a tenant of a multi-tenant database system, and a fourth user input indicating at least one of a rule associated with the data metric and a trigger based at least in part on the data metric, wherein the data stream is associated with a database operating in association with a plurality of user profiles, a user profile comprising user data unified across a plurality of user identifiers;
receive, from the data streaming source, an at least near real-time data stream comprising information specific to the subscriber key and corresponding to the data metric configured for the tenant of the multi-tenant database system based at least in part on the first user input, the second user input, and the third user input, the at least near real-time data stream associated with a first user profile stored at the database;
evaluate at least one of the rule or the trigger based at least in part on the fourth user input and ingesting the at least near real-time data stream comprising the information;
create an event data object based at least in part on the evaluated rule or the evaluated trigger, wherein the created event data object is stored for the tenant as a record-level object in the database and is associated with an alert; and
perform an action based at least in part on the evaluated rule or the evaluated trigger, wherein the action comprises sending a notification message associated with the alert for display via a second user interface of a second user device associated with the first user profile in response to at least a portion of the at least near real-time data stream.

15. The apparatus of claim 14, wherein the instructions are further executable by the at least one processor to cause the apparatus to:
receive a fifth user input comprising a selection of a target for the action, wherein performing the action comprises performing the action at the target.

16. The apparatus of claim 15, wherein the instructions are further executable by the at least one processor to cause the apparatus to:
execute an insight on the at least near real-time data stream via an ingestion engine to evaluate at least one of the rule or the trigger.

17. The apparatus of claim 14, wherein the instructions are further executable by the at least one processor to cause the apparatus to:
store at least a second portion of the at least near real-time data stream in a cache memory of the multi-tenant database system.

18. A non-transitory computer-readable medium storing code for data processing at an application server, the code comprising instructions executable by a processor to:

receive, via a first user interface of a first user device, a first user input indicating a data stream, a second user input indicating a subscriber key for a data streaming source of the data stream, a third user input indicating a data metric configured for a tenant of a multi-tenant database system, and a fourth user input indicating at least one of a rule associated with the data metric and a trigger based at least in part on the data metric, wherein the data stream is associated with a database operating in association with a plurality of user profiles, a user profile comprising user data unified across a plurality of user identifiers;

receive, from the data streaming source, an at least near real-time data stream comprising information specific to the subscriber key and corresponding to the data metric configured for the tenant of the multi-tenant database system based at least in part on the first user input, the second user input, and the third user input, the at least near real-time data stream associated with a first user profile stored at the database;

evaluate at least one of the rule or the trigger based at least in part on the fourth user input and ingesting the at least near real-time data stream comprising the information;

create an event data object based at least in part on the evaluated rule or the evaluated trigger, wherein the created event data object is stored for the tenant as a record-level object in the database and is associated with an alert; and perform an action based at least in part on the evaluated rule or the evaluated trigger, wherein the action comprises sending a notification message associated with the alert for display via a second user interface of a second user device associated with the first user profile in response to at least a portion of the at least near real-time data stream.

19. The non-transitory computer-readable medium of claim 18, wherein the instructions are further executable by the processor to:

receive a fifth user input comprising a selection of a target for the action, wherein performing the action comprises performing the action at the target.

20. The non-transitory computer-readable medium of claim 19, wherein the instructions are further executable by the processor to:

execute an insight on the at least near real-time data stream via an ingestion engine to evaluate at least one of the rule or the trigger.

* * * * *